(12) United States Patent
Lubbers (10) Patent No.: US 7,287,128 B1
(45) Date of Patent: Oct. 23, 2007

(54) WRITE ON REFERENCE MESH

(75) Inventor: Clark Edward Lubbers, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 458 days.

(21) Appl. No.: 11/042,424

(22) Filed: Jan. 25, 2005

(51) Int. Cl.
*G06F 12/00* (2006.01)
(52) U.S. Cl. .................. 711/147; 711/202; 709/213
(58) Field of Classification Search ............... None
See application file for complete search history.

(56) References Cited

U.S. PATENT DOCUMENTS

| | | | |
|---|---|---|---|
| 5,377,344 A | 12/1994 | Stager et al. | |
| 6,202,127 B1 | 3/2001 | Dean et al. | |
| 6,442,585 B1 | 8/2002 | Dean et al. | |
| 6,601,149 B1 | 7/2003 | Brock et al. | |
| 6,742,101 B2 | 5/2004 | Miryala et al. | |
| 6,970,809 B2 | 11/2005 | Feng et al. | |
| 7,120,728 B2 * | 10/2006 | Krakirian et al. ............... | 711/6 |
| 2003/0005070 A1 | 1/2003 | Narasimhamurthy et al. | |
| 2003/0007457 A1 | 1/2003 | Farrell et al. | |
| 2004/0030857 A1 * | 2/2004 | Krakirian et al. ............ | 711/206 |
| 2005/0086421 A1 * | 4/2005 | Nassar ........................ | 711/103 |

\* cited by examiner

*Primary Examiner*—Kevin Verbrugge
(74) *Attorney, Agent, or Firm*—Fellers, Snider, et al.

(57) ABSTRACT

A Write On Reference Mesh (WORM) detects a memory write operation to a reference location of a mesh entry in a memory window mesh and invokes an action responsive to the detected write. The mesh entries are laid out in zones. The invoked action is dependent on the individual mesh entry or the zone in which the write operation was detected. The action invoked can be configured by the custom logic provided by the vendor. Accordingly, in a special purpose processor, custom logic can trigger a wide variety of sophisticated actions by detecting a write operation to one of any number of specific memory addresses in the memory window.

20 Claims, 5 Drawing Sheets

WRITE ON REFERENCE MESH

TECHNICAL FIELD

The invention relates generally to memory subsystems, and more particularly to a write on reference mesh.

BACKGROUND

Traditional storage frameworks are often assembled from discrete components, such as off-the-shelf generic processors and firmware to meet competitive standards of performance and manageability. However, such combinations of generic components fail to meet the requirements and expectations of a modem network-centric storage model. Accordingly, new, specially targeted components are being developed for storage area network (SAN) applications.

One such component is an Intelligent Storage Processor (ISP). An ISP represents a special-purpose processor that combines features of a storage controller with an embedded switch fabric to provide a high-performance virtualization storage service that presents a logical view of storage instead of a device-bound physical view of storage. For example, an ISP can replace a general processor in a storage controller system or intelligent SAN switch to process performance critical read/write commands, accelerate storage applications and provide manageability features.

System vendors provide custom logic for such special purpose processors to provide specific "value add" product features. For example, a storage system vendor can design one or more ISP's into a storage system and provide custom logic to enable potentially proprietary intelligent SAN services, such as routing, volume management, data migration and replication to be integrated into fabric switches, routers, storage management appliances, storage arrays and blade servers. As such, an ISP is equipped with the necessary hardware interfaces and software APIs to allow integration with a variety of existing storage networking equipment and management applications.

Special purpose processors attempt to support programming models flexible and powerful enough to meet the increasingly strenuous performance requirements and programming demands of storage system designers. However, existing approaches have not provided memory solutions that adequately accommodate the sophisticated, high performance needs of these systems.

SUMMARY

Implementations described and claimed herein address the foregoing problems by providing a Write On Reference Mesh (WORM) that detects a memory write operation to a reference location of a mesh entry in a memory window mesh and invokes an action responsive to the detected write. The mesh entries are laid out in zones. The invoked action is dependent on the individual mesh entry or the zone in which the write operation was detected. The action invoked can be configured by the custom logic provided by the vendor. Accordingly, in a special purpose processor, custom logic can trigger a wide variety of sophisticated actions by writing to a specific memory address in the memory window.

In one implementation, a memory window mesh is defined to include an array of mesh entries. Each mesh entry includes a plurality of address locations. A mesh entry includes an address location designated as a reference location. A write operation to the reference location of a mesh entry is detected. An action that is associated with the written mesh entry is triggered, responsive to the detecting operation.

In another implementation, a system provides a memory window mesh that includes an array of mesh entries. Each mesh entry includes a plurality of address locations. A mesh entry includes an address location designated as a reference location. A storage engine triggers an action that is associated with the written mesh entry, responsive to detection of a write operation to the reference location of a mesh entry.

Other implementations are also described and recited herein.

DETAILED DESCRIPTIONS

Figure 1:
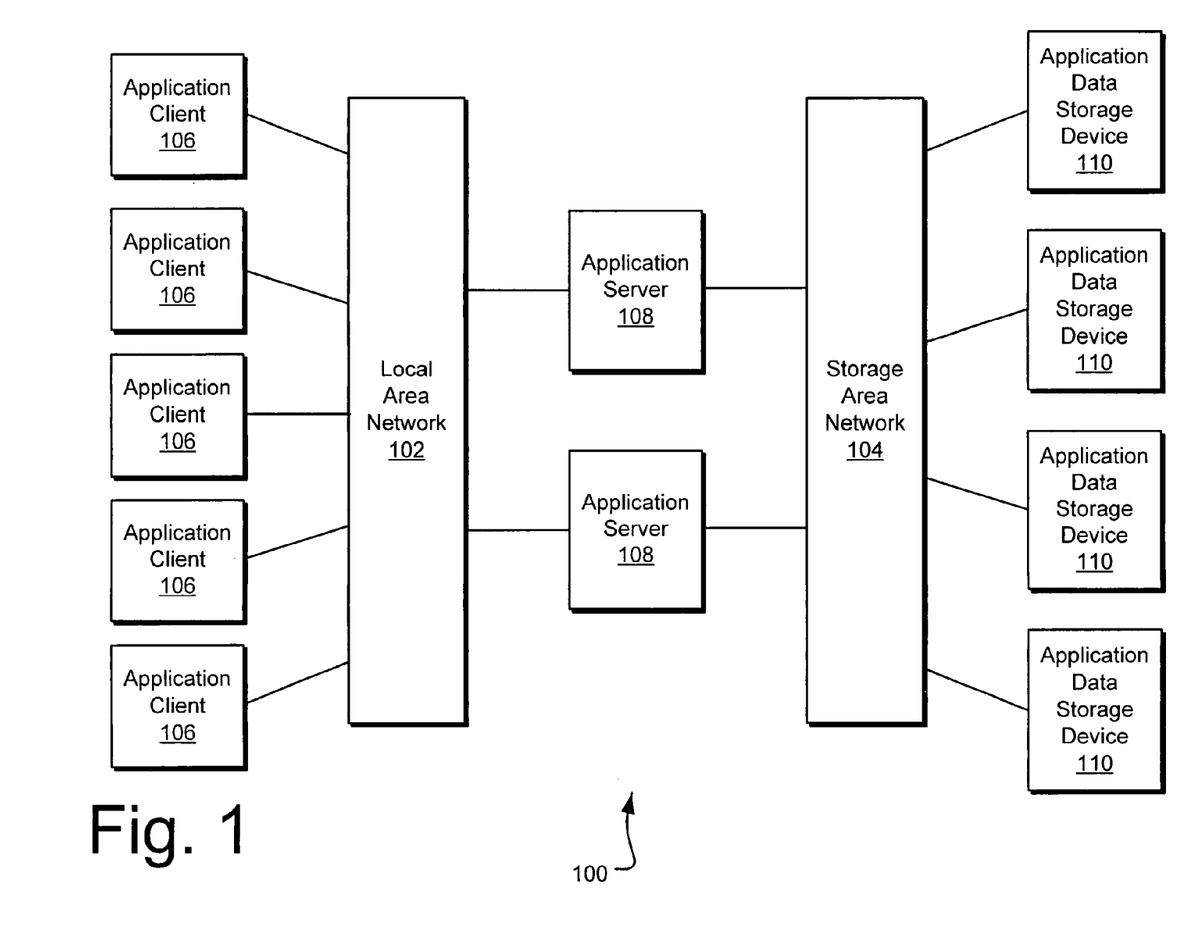
FIG. 1 illustrates an exemplary computing and storage framework including a local area network (LAN) and a storage area network (SAN).

FIG. 1 illustrates an exemplary computing and storage framework 100 including a local area network (LAN) 102 and a storage area network (SAN) 104. Various application clients 106 are networked to application servers 108 via the LAN 102. The application servers 108 allow the application clients 106 to access applications that are resident on the application servers 108. Such applications may depend on data (e.g., an email database) stored at one or more of the application data storage devices 110. Accordingly, the SAN 104 provides connectivity between the application servers 108 and the application data storage devices 110 to allow the application to access the data.

The SAN 104 includes one or more intelligent SAN switches, which include intelligent storage processor boards having typically two intelligent storage processors (ISPs) for redundancy. Intelligent SAN switches interface storage devices 110 to the rest of the SAN switch fabric in SAN 104. Each intelligent SAN switch can provide assorted storage services, such as routing, volume management, data migration and replication, implemented in various combinations of hardware, firmware, and/or application software and executed by the ISP and/or a related processor. The SAN 104 shown in FIG. 1 includes intelligent switches having ISPs that implement an exemplary Write On Reference Mesh (WORM), which supports a sophisticated programming model as described in more detail with regard to subsequent figures.

Figure 2:
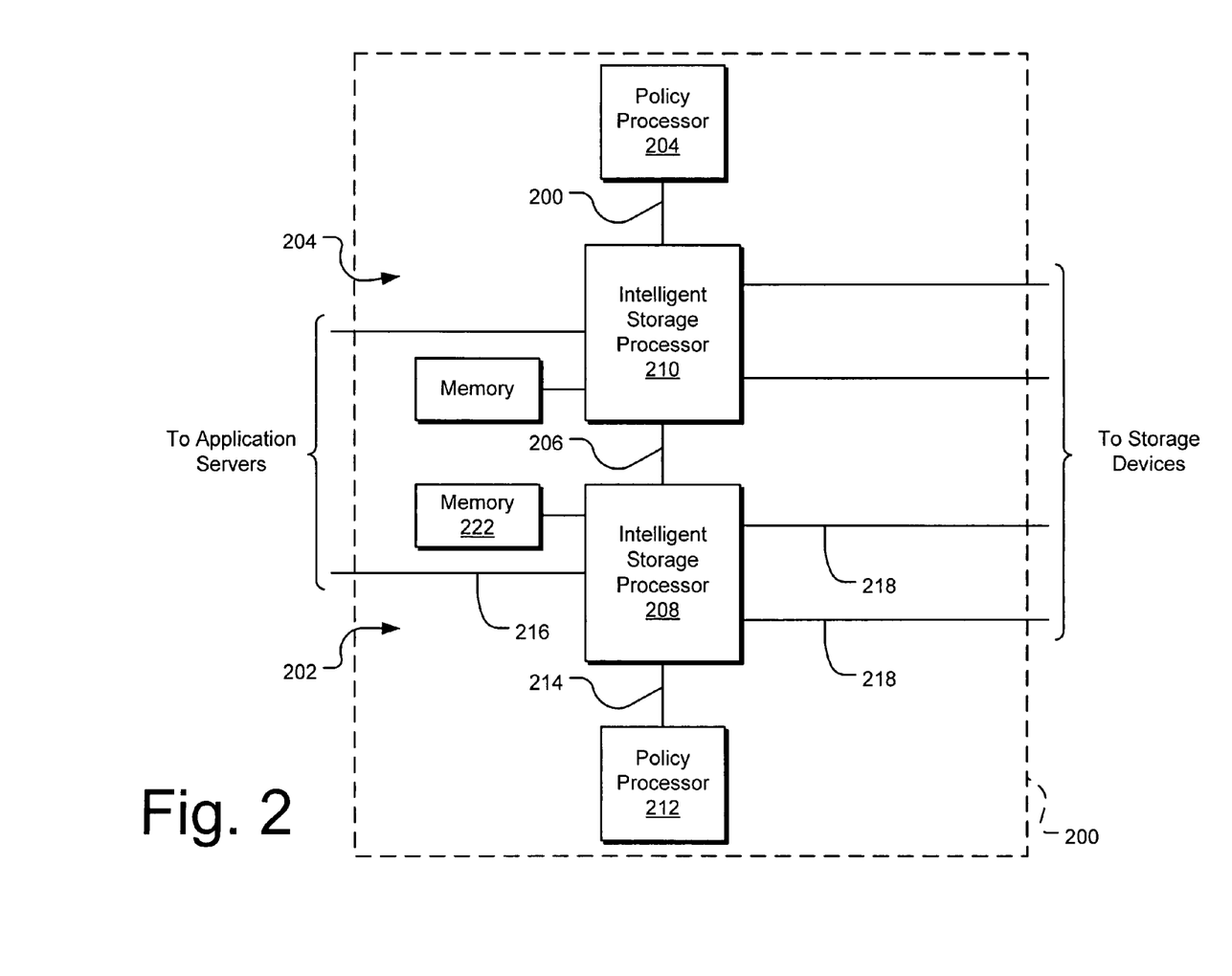
FIG. 2 illustrates a block diagram of an exemplary intelligent storage processor board of an intelligent SAN switch.

FIG. 2 illustrates a block diagram of an exemplary intelligent storage processor board 200 of an intelligent SAN switch. The ISP board 200 includes two ISP subsystems 202 and 204 coupled by a 16-bit (or less) wide parallel low voltage differential (LVD) bus 206 (the "e-bus"). The ISP subsystem 202 includes an ISP 208, which includes interfaces to one fibre channel host link 216 and two fibre channel storage links 218, and a policy processor 212 executing a real-time operating system (RTOS). The ISP 208 and the policy processor 212 can communicate via a PCI bus 214, and both the ISP 208 and the policy processor 212 can access memory 222.

In one implementation, the ISP 208 includes seven function controller cores (FCCs) with different custom logic and three list manager (LM) special purpose processors. The FCCs and the LMs communicate via a cross point switch (CPS) FCC-LM message crossbar. As such, the FCCs can generate CPS messages in response to a given condition and send these messages through the CPS to a list manager in order to access a memory module or invoke a desired ISP action. Likewise, responses from a list manager may be communicated to an FCC via the CPS. A policy processor may also communicate with the list managers and access memory using the CPS. It should be understood that other implementations may also be employed.

An FCC is a specialized processor capable of executing customized logic based on a particular function. An FCC contains a highly flexible feature set and a powerful interface for accessing memory through the CPS using CPS messages to communicate with the list managers. A list manager is a specialized message processor that can act as an access point to memory for the FCCs of the ISP 208 and its partners, ISP 210, as well as the policy processor 212. A list manager can also provide other specialized functionality responsive to messages received through the CPS. Received messages and data are stored in lists maintained and accessed by the list manager. According to a scheduling protocol, the list manager executes operations defined by the messages.

The policy processor 212 can be programmed by a switch vendor to provide "value-add" functionality. That is, the policy processor 212 can execute custom logic to perform sophisticated operations via the ISP 208. In many ways, the policy processor 212 is treated by the ISP 208 as somewhat equivalent to an FCC. The policy processor 212 can send messages to any list manager and receive responses back from any list manager, all via the CPS. A message response issued by the ISP results in an interrupt to the policy processor 212, which, in reaction to the interrupt, can read registers of the ISP to get the list manager's response. Therefore, the policy processor 212 can also access memories 222 and trigger actions within the ISP 208 using CPS messages and the list managers.

Accordingly, a SAN switch vendor can create custom storage service applications for execution on the policy processor 212. The storage service applications can access the functionality of the ISP 208 through ISP register access and DMA over the PCI bus 214, such as by opening and accessing memory windows via individual PCI read or write operations with the attendant overhead. Some implementations may also support a faster access than individual PCI access. In an implementation of the described system, for example, the policy processor is implemented with a PowerPC processor that accesses the ISP functionality through cache writes across the PCI bus 214, although other processors and access methods may be employed.

Figure 3:
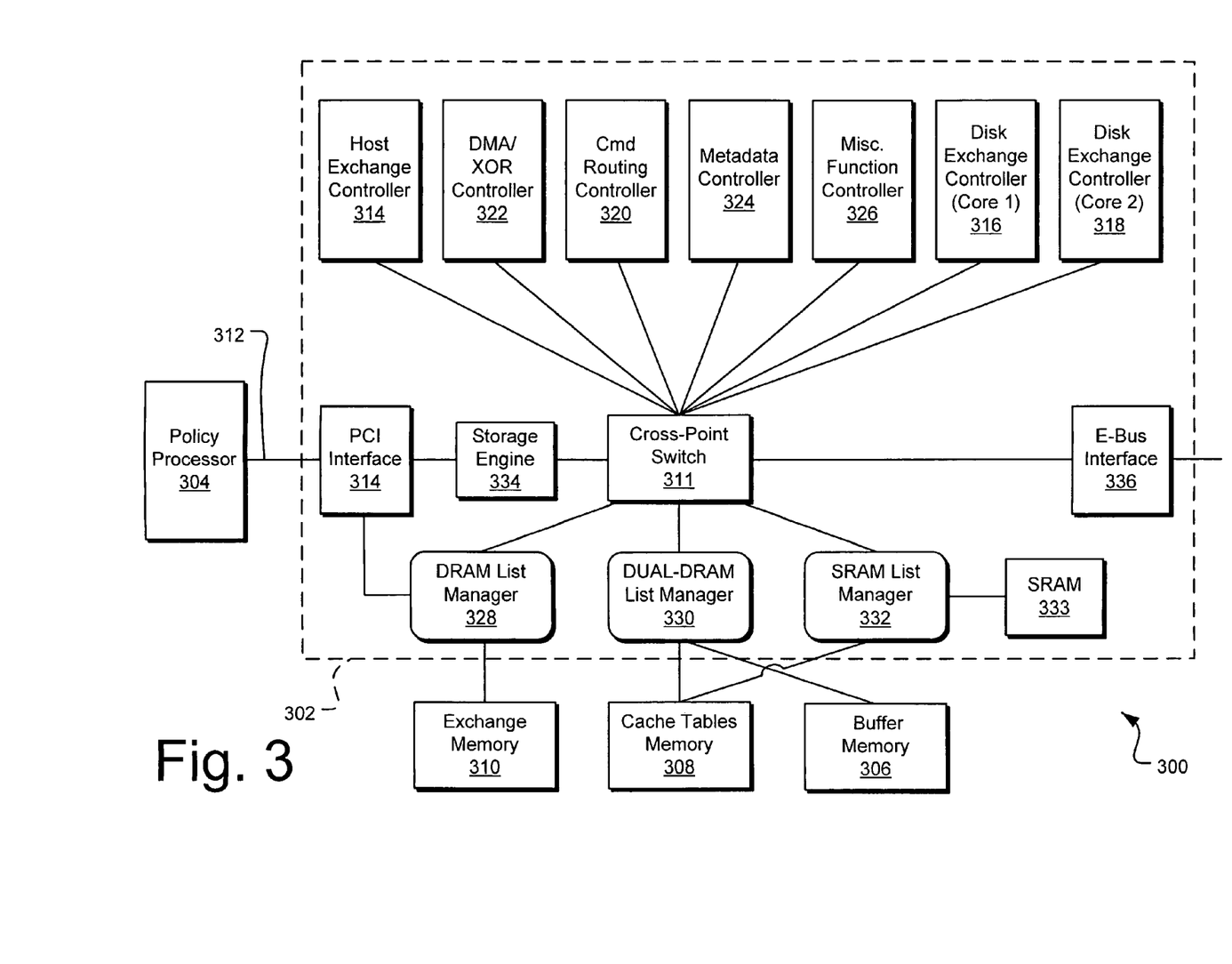
FIG. 3 illustrates components of an exemplary storage system.

FIG. 3 illustrates components of an exemplary storage system 300. Among other components, an ISP 302 is coupled to a policy processor 304, a buffer memory module 306, a cache table memory 308, and an exchange memory module 310. Accordingly, the policy processor 304 can execute custom applications for the storage system, accessing the functionality of the ISP and the data in the memory modules via a PCI bus 312 and a PCI interface 314 in the ISP 302.

In an implementation of the described system 300, the policy processor 304 is presented with a 32 MB memory window over the PCI bus 312 to allow access to the ISP 302, although alternatively sized memory windows are contemplated. For example, an exemplary policy processor may have a cache line size of 32 bytes and provide a mechanism for forcing out an entire cache line as a single "burst" operation. For a 64-bit PCI interface, this would result (after arbitration and connection) with an address cycle followed by four 64-bit data word cycles.

In one implementation, the ISP 302 includes seven FCCs. Three of these FCCs are intimately connected to the fibre channel interfaces. Each of these FCCs controls two DMA interfaces. These FCCs are named the host exchange controller 314, the disk exchange controller (core 1) 316, and the disk exchange controller (core 2) 318. The other four FCCs have some custom logic but also provide general purpose functionality: the command routing controller 320, the DMA/XOR controller 322, the metadata controller 324, and the miscellaneous function controller 326.

Each FCC has a register address space of 65,536 16-bit registers (128 KB). The top quarter of this space (0xC000-0xFFFF) is dedicated to a writable control storage (WCS) to contain the actual FCC programming instructions. The low order 512 16-bits are direct registers. The remainder of the register address space may provide access to custom logic or general variable space. The FCCs can access memories 306, 308, and 310 via a CPS 311 and the list managers. Through the list managers, the FCCs can request list manipulation, list search, field extraction, field insertion (store), field copy, field increment, field decrement, field bit set, and field bit clear, as well as requesting information about the lists managed by a list manager.

The list managers provide the FCCs and policy processor 304 with access to the memory modules. The buffer memory module 306 is primarily dedicated to holding actual user data and some associated metadata consumed by the policy processor 304. The exchange memory module 310 holds metadata describing the buffers in the buffer memory module 306. The cache tables memory module 308 can also contain metadata, although in another particular implementation, this memory module 308 is not employed.. The SRAM module 333 is used for high speed access to a list of outstanding commands and the current state in progress. Consequently, the DRAM list manager 328 provides access to the exchange memory module 308 and the PCI interface 314. The dual-DRAM list manager 330 provides access to the cache tables memory module 308 and the buffer memory module 306. The SRAM list manager 332 provides access to the SRAM 333 and the cache table memory 308.

The ISP 302 may communicate with a partner ISP (not shown) using the e-bus interface 336. A message, which may include an operation code and/or data, may therefore be sent by a list manager through the CPS 311 to the e-bus interface 336, which sends the message to an e-bus interface in the partner ISP. Likewise, the FCCs and the policy processor of a given ISP can send messages through CPS 311 in the ISP 302 to the e-bus interface 336, thereby allowing FCCs and policy processors in the ISP 302 to communicate commands and data with list managers in the partner ISP.

Figure 4:
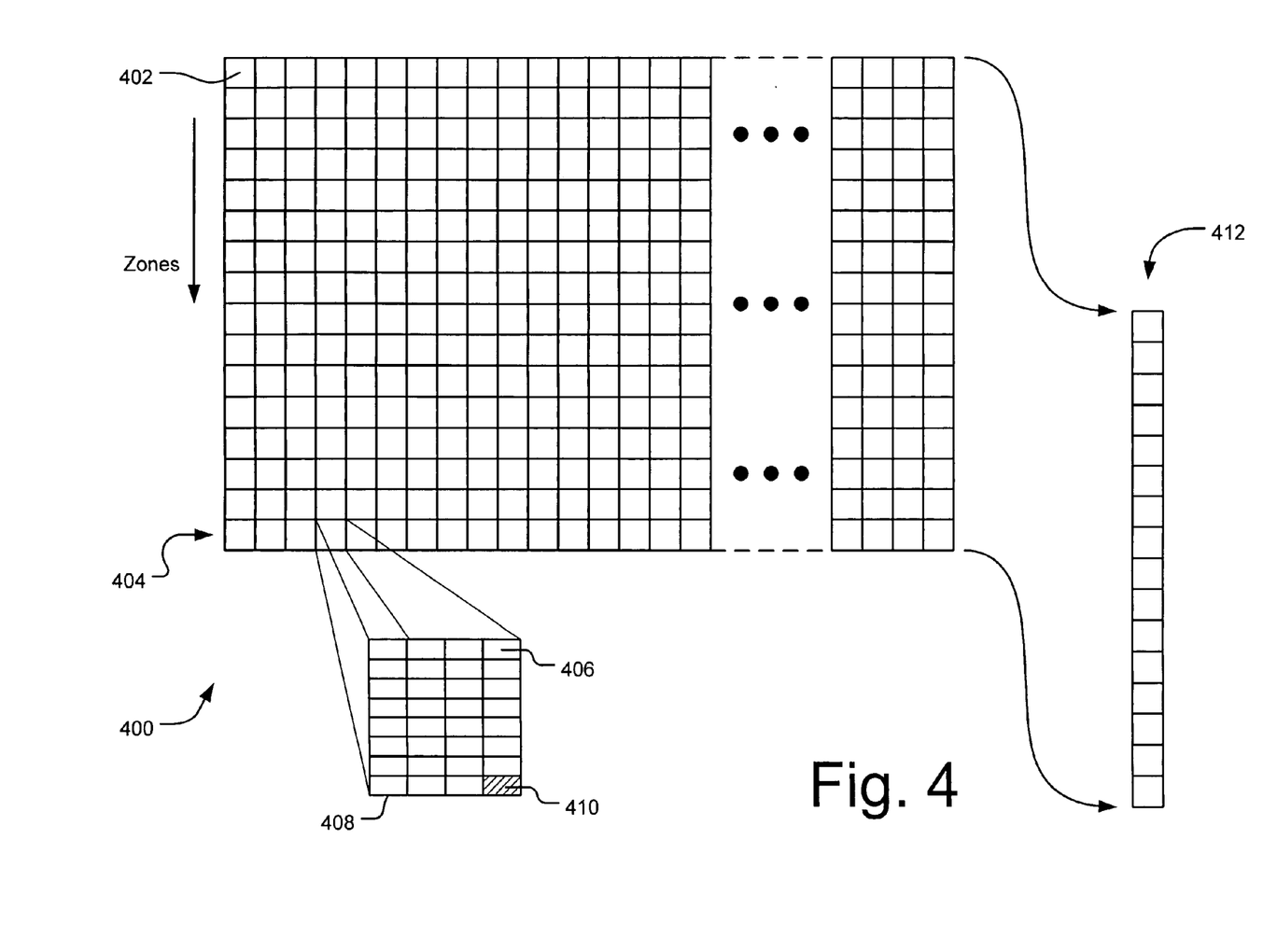
FIG. 4 illustrates an exemplary write on reference mesh.

FIG. 4 illustrates an exemplary write on reference mesh 400. In one implementation, a 64 MB memory window (26-bit memory address) is defined by a base address register (not shown) in the ISP. The lower 32 MB of the window will allow access to the other memory associated with the storage engine, such as the cache table memory module and the exchange memory module. The upper 32 MB of the memory window is called the CPS Access Region (CAR), through which the policy processor can access ISP memory and functionality. In an exemplary implementation, the lower 25-bits of an address in an exemplary memory window are defined as follows:

TABLE 1

25-bit Address Definition

| Number of Bits | Bit Locations | Description |
|---|---|---|
| 5 | 0000001F | Byte Offset |
| 16 | 001FFFE0 | Mesh Index |
| 4 | 01E00000 | Zone Index |

The Mesh Index is ignored in terms of addressing (although it may be used later as a "tag" in a CPS message). As such, when the policy processor writes to the CAR of the memory window, the 25-bit address collapses to address only 32 actual bytes implemented as a very fast memory access in the PCI interface. Such access may be performed as 32-byte burst reads or 32-byte burst writes, although four-byte (32-bit) single long-word access and single byte access may also be implemented.

The mesh 400 includes a number of aligned mesh entries 402 arranged in zones 404, which are accessible by the policy processor through the memory window. In one implementation, the mesh is divided on 2 MB boundaries into 16 zones, although other configurations are contemplated. Accordingly, the policy processor can write data packets (e.g., 32 bytes of data in one implementation) in individual mesh entries in the mesh 400 through the memory window, where each byte of data is written to an individual address location in a mesh entry.

Accordingly, each mesh entry 402 of the mesh 400 includes a number of address locations 406, as shown in exploded frame 408. A reference location 410 is designated in each mesh entry to trigger a specified action. Detection of a write to a reference location represents a "reference", an event that triggers an action specifically associated with the zone in which the written cell entry is located.

Generally, a write on reference mesh implements a write-sensitive memory window that triggers a specified action in the ISP in response to detection of a memory write operation to a reference location of an individual mesh entry in the mesh. In an exemplary implementation, a write operation to a reference location also results in generation of the "tag", which is derived from the mesh index portion of the memory address used in the memory write operation.

For example, write-sensitivity in a mesh entry may be implemented as follows:

(1) If (Address & Mask1)==Match, then a write to a reference location in a mesh entry is detected.

(2) Tag=(Address & Mask2)>>5 where the Address represents the write address from the PCI write operation, the Mask1 is clear in the Address bit locations not containing a Byte Offset (e.g., Mask1=0x0000001F), the Mask2 is set in the Address bit locations containing the Mesh Index (e.g., Mask2=0x001FFFE0), the Match represents a reference location within a given mesh entry of a given zone (e.g., 0x0000001F), and the Shift represents the number of bits required to move the Mesh Index to the lower order bits of a register (e.g., Shift=5 in the exemplary 25-bit address example given in Table 1). This detection logic works when the reference location is contained in a multiple-byte write operation. Therefore, if the write to the reference location in the mesh entry is detected, the Tag is created from the Mesh Index portion of the write address.

For each zone, the ISP supports a 32-bit register and six 16-bit registers, called zone template registers 412. Each 32-bit register is called a zone packet bit mask register and is defined as follows:

TABLE 2

Exemplary definition of 32-bit register in zone template register set

| Number of Bits | Bit Locations | Description |
|---|---|---|
| 22 | 003FFFFF | Scatter-Gather Mask |
| 2 | 00C00000 | Reserved |
| 1 | 01000000 | Flag |
| 7 | FE000000 | Reserved |

The six 16-bit registers, called packet template registers, are defined as follows:

TABLE 6

Exemplary definition of 16-bit registers in zone template register set

| Register Number | Description |
|---|---|
| 0 | CPS Header Field |
| 1 | Operation (opcode | list field) |
| 2 | Tag |
| 3 | Fixed parameter 0 |
| 4 | Fixed parameter 1 |
| 5 | Fixed parameter 2 |

The combination of the six registers defined above and the 16 data words (i.e., the 32-byte packet) written by the policy processor can be treated as an array of 22 16-bit registers. If a write to the reference location is detected, the Tag value is written the Tag field of the packet template registers of the corresponding zone. The other fields of the packet template register are predefined by the policy processor for each zone.

The scatter-gather mask of the corresponding zone template register defines which of these 22 registers is used to construct an automatically generated CPS message. For example, if the scatter-gather mask contains "000003F", only the Header, Operation, Tag, and Fixed Parameter fields 0, 1, and 2 are used to construct the CPS packet. In contrast, if the scatter-gather mask contains "00001FF", the Header, Operation, Tag, Fixed Parameter fields 0, 1, and 2, and data words 0-2 are used to construct the CPS packet.

Generation of a CPS packet is conditional on settings of the Flag bit in the zone template register and bit 15 of the data word 0 (written by the policy processor to the mesh entry). If the Flag is clear, the CPS packet is automatically generated when the reference is detected. Also, if the Flag is set and bit 15 of data word 0 is set, then the CPS packet is automatically generated when the reference is detected. However, if the Flag is set and bit 15 of data word 0 is clear, then the CPS packet is not automatically generated when the reference is detected. This conditional triggering of the CPS packet generation prevents the generation of an action (i.e., generation of a CPS packet) when less than the entire 32-byte data packet was flushed from the policy processor cache.

As discussed, list managers are specialized message processors. Accordingly, list managers support a set of operation codes that result in actions within the ISP or its partner ISP. Exemplary codes may include without limitation, operation such as "Read/Write Sequential Memory Locations" (Read Seq/Write Seq), "Read/Write Random Memory Location" (Read Rand/Write Rand), "Fill Table", "Get List Head/Tail" (Get Head/Get Tail), "Increment/Decrement Field" (Inc Field/Dec Field), "Write Entry Data", "Post Entry Data", "Unlink and Read Seq", "Unlink and Read Random", "Write Seq and Post", "Write Random and Post", "Increment Field and Post", "Write Ring", "Write Ring and Notify", and "Read Ring". Through actions represented by these exemplary operation codes, memory can be accessed, messages can be queued (i.e., "posted") for processing by an FCC, and a PCI device (e.g., the partner ISP) can be notified about new list entries (e.g., messages) to be processed.

The header field contains routing information that directs the CPS packet to a specific list manager. As such, the packet template register associated with a given zone can define packets destined for a specific list manager to trigger a specific action to achieve a specific result. The opcode field contains an operation code for a list manager to process, representing an action associated with the CPS message received by the list manager. Other fields can contain data useful to the associated action. For example, the list field, the Tag field, and any of the other register fields may influence which list is accessed, which data is communicated, etc. Exemplary actions are described below.

In one implementation, mirroring metadata on both partner ISPs can be important for redundancy purposes, although the mirroring may be at different addresses within the different ISP subsystems. In this scenario, the action triggered in response to a reference is a write operation of the data across the e-bus to the partner ISP.

A zone, called a "data transport zone", may therefore be dedicated to this function to define a "data transport window." The packet template register of the data transport zone includes a header field that routes the packet through the CPS to a specific list manager. The operation field entry includes a Write Entry Data and a list field entry references a table that references the corresponding memory range in the memory of the partner ISP.

For example, a write operation by the policy processor to a reference location of a mesh entry in a data transport zone is detected in a first ISP. In response, a CPS message is automatically generated and routed to a list manager in the partner ISP. The CPS message includes a list field that references the appropriate memory range for mirrored writes in the partner ISP. When the list manager executes the opcode of the CPS message, the data written to the first ISP will be written to memory in the partner ISP.

In a second implementation, request and response messages may be sent quickly between ISP partners, for example, to implement a fibre channel protocol exchange or a SCSI exchange. In this scenario, the action triggered in response to a reference is transmission of a request or response across the e-bus to a message ring buffer of the partner ISP.

A zone, called a "message transport zone", may be dedicated to this functionality. The packet template register of the message transport zone includes a header field that routes the packet through the CPS to a specific list manager. The opcode field entry includes a Write Ring and Notify opcode and a ring field entry that identifies the appropriate ring for the message.

For example, a write operation to a message ring buffer of a partner ISP may be invoked by the policy processor by a write to a message transport zone of the policy processor's ISP. When the write to the reference location of a mesh entry in the message transport zone is detected, a CPS message is automatically generated and routed to a list manager in the partner ISP. The CPS message includes a field that references the appropriate message ring in the partner ISP. When the list manager in the partner ISP executes the opcode of the CPS message, the message is written to a ring buffer in the memory accessible by the partner ISP.

Figure 5:
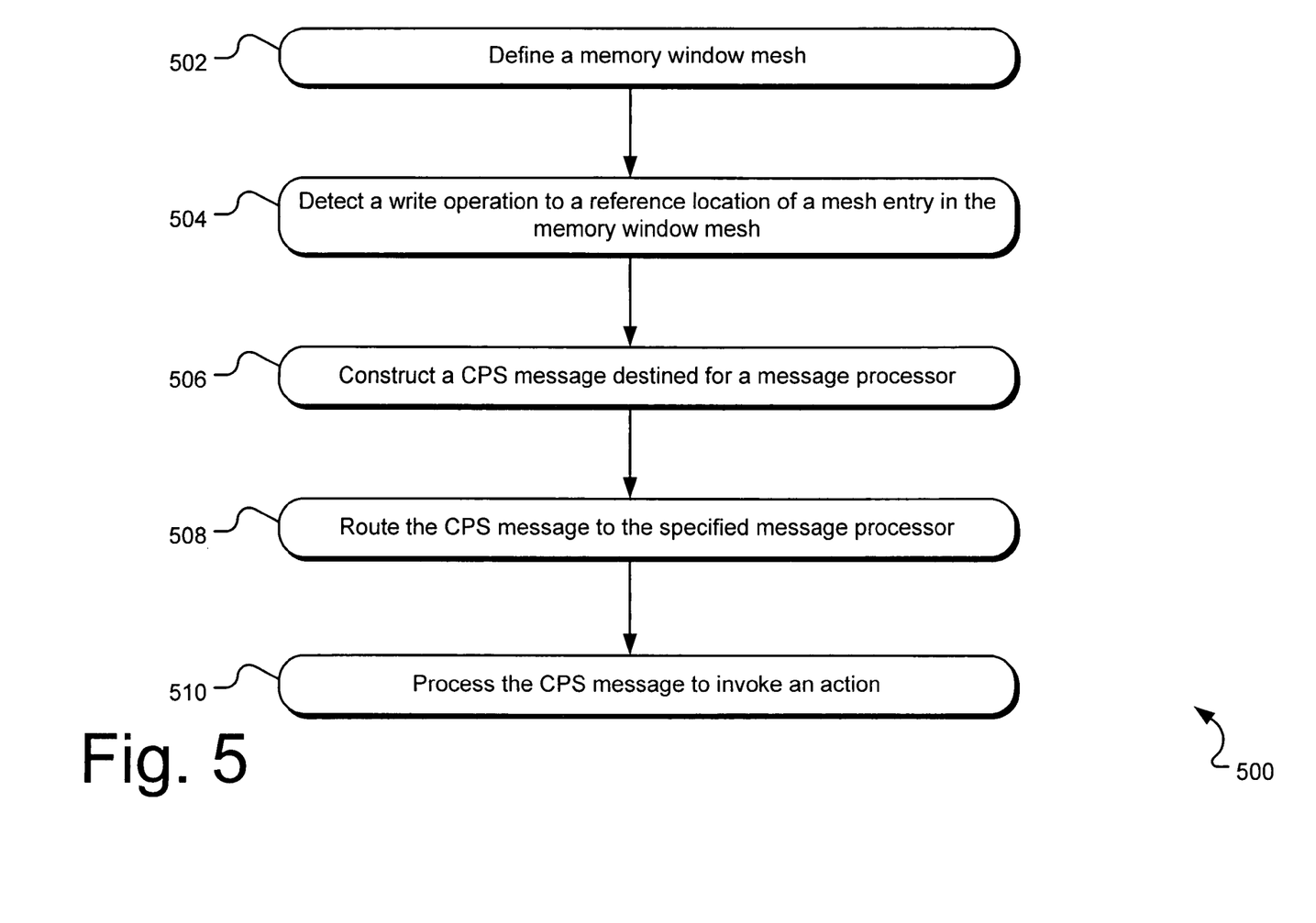
FIG. 5 illustrates logical operations in an exemplary storage system employing a write on reference mesh.

FIG. 5 illustrates logic operations in an exemplary storage system employing a write on reference mesh. A windowing operation 502 defines a write on reference mesh in a memory window, such as a PCI memory window. In one implementation, the mesh is aligned on a 64 MB boundary, although other alignments are contemplated. The mesh includes mesh entries organized in zones. Each zone has zone template registers associated with it to define the action triggered when a write to a reference location is detected within the zone.

A detection operation 504 detects a write operation to a reference location of a mesh entry in the write on reference mesh. An exemplary detection operation is described above using circuit logic and Mask and Match values, although other detection operations are contemplated. In some implementations, a Tag value may also be determined in the detection operation 504 and loaded into one of the zone template registers.

A messaging operation 506 constructs a CPS message including an operation code and routing information (in a Header field). The 16-bit zone template registers and the data of the write operation, as masked by the scatter-gather mask of the 32-bit zone template register, are used in this construction. Thus, as selected by the associated scatter-gather mask, the 32 bytes of data written by the policy processor and fields of the 16-bit zone template registers of the zone in which the mesh entry is located are copied into a message packet.

A routing operation 508 sends the constructed message packet to the list manager identified in the routing information in the Header field of the message packet. Alternatively, the message could be sent to other pieces of custom logic within the subsystem. In some implementations, the list manager may be on the local ISP, on the partner ISP, or in other logic. The message packet is sent by the storage engine through the CPS switch to its destination. Accordingly, the routing is performed by the CPS switch.

A processing operation 510 executes the operation specified by the opcode and other fields in the message packet. Because list managers are sophisticated message processors, such operations may vary considerably. Some exemplary operations have been described herein, but list managers may be constructed to perform a wide variety of operations and should not be limited by these examples.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understand that the described technology may be employed independent of a storage system. Other embodiments are therefore contemplated.

What is claimed is:

1. A method comprising:

defining a memory window mesh including an array of mesh entries, each mesh entry including a plurality of address locations, wherein a mesh entry includes an address location designated as a reference location;

detecting a write operation to the reference location of a mesh entry; and triggering an action that is associated with the written mesh entry, responsive to the detecting operation.

2. The method of claim 1 wherein the memory window mesh is divided into zones, each zone including a plurality of mesh entries, and the triggered action is associated with the zone in which the written mesh entry is included.

3. The method of claim 1 wherein the memory window mesh is divided into zones, each zone being associated with action descriptor that designates the action to be triggered.

4. The method of claim 1 wherein the detected write operation is directed to a memory address of a first memory and the triggering operation triggers another write operation directed to a memory address of a second memory.

5. The method of claim 4 wherein the memory address written in the second memory depends on the zone in which the written mesh entry is included.

6. The method of claim 4 wherein the memory address written in the second memory depends on the mesh entry written in the first memory.

7. The method of claim 4 wherein the memory address written in the second memory depends on the mesh index in the memory address written in the first memory.

8. The method of claim 1 wherein the triggering operation generates a message and sends the message to a message processor.

9. The method of claim 8 wherein the message generated depends on the zone in which the written mesh entry is included.

10. The method of claim 8 wherein the message generated depends on the mesh entry written in the first memory.

11. The method of claim 8 wherein the message generated depends on the mesh index in the memory address written in the first memory.

12. The method of claim 1 wherein the detection operation detects when the write operation to the mesh entry is completed.

13. The method of claim 1 wherein each mesh entry includes a plurality of address locations and the reference location represents a predetermined address location in the mesh entry that is designated to trigger the action, such that write operations to other address locations in the mesh entry do not trigger the action.

14. A system comprising:

a memory window mesh that includes an array of mesh entries, each mesh entry including a plurality of address locations, wherein a mesh entry includes an address location designated as a reference location; and a storage engine that detects a write operation to the reference location of one of the mesh entries and responsively triggers an action associated with the one of the entries.

15. The system of claim 14 wherein the memory window mesh is divided into zones, each zone including a plurality of mesh entries, and the triggered action is associated with the zone in which the written mesh entry is included.

16. The system of claim 14 wherein the memory window mesh is divided into zones, each zone being associated with action descriptor that designates the action to be triggered.

17. The system of claim 14 wherein the detected write operation is directed to a memory address of a first memory and the triggered action triggers another write operation directed to a memory address of a second memory.

18. The system of claim 14 wherein the triggered action generates a message and sends the message to a message processor.

19. The system of claim 14 wherein the detection of a write operation to the reference location of a mesh entry detects when the write operation to the mesh entry is completed.

20. The system of claim 14 wherein each mesh entry includes a plurality of address locations and the reference location represents a predetermined address location in the mesh entry that is designated to trigger the action, such that write operations to other address locations in the mesh entry do not trigger the action.

* * * * *